May 22, 1956

W. B. PETERSON, JR 2,746,413

CAN END FEEDER

Filed Dec. 24, 1951

WILLIAM B. PETERSON, JR.
INVENTOR.

BY

ATTORNEY

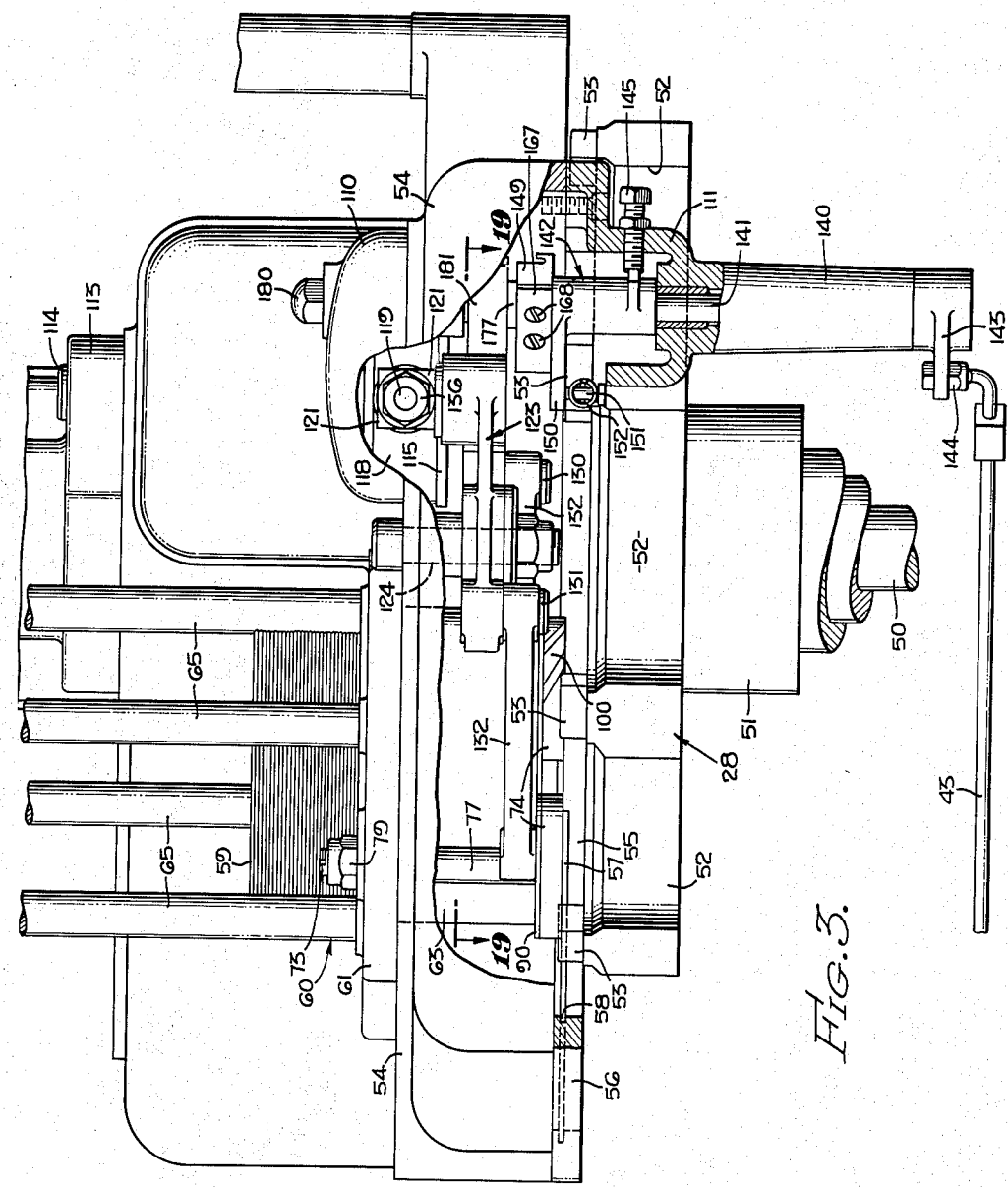

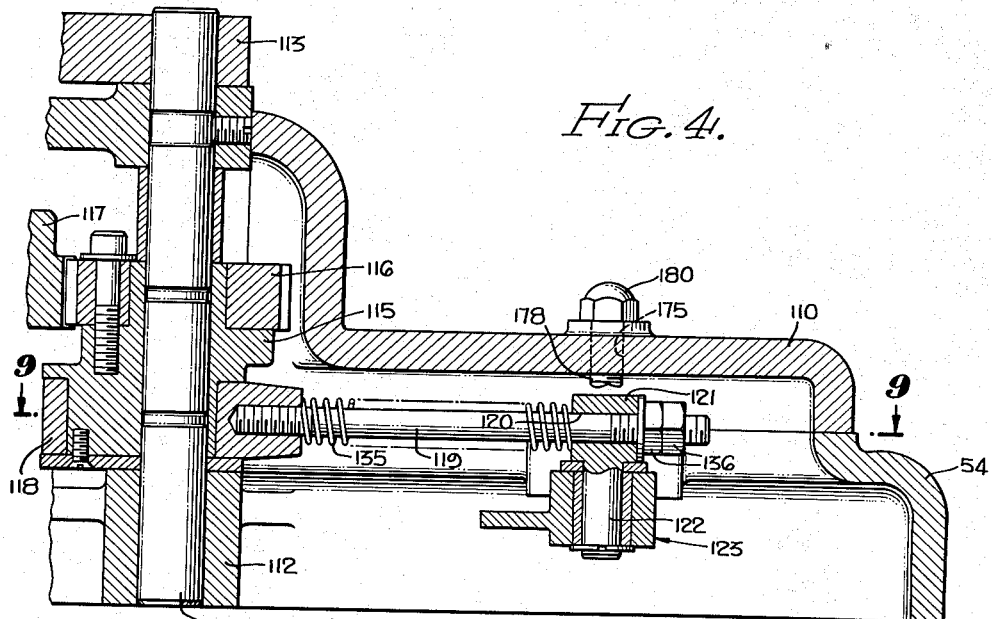
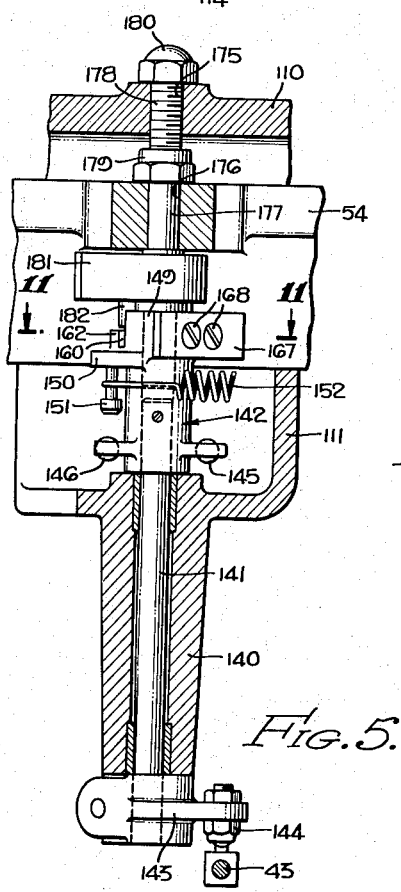
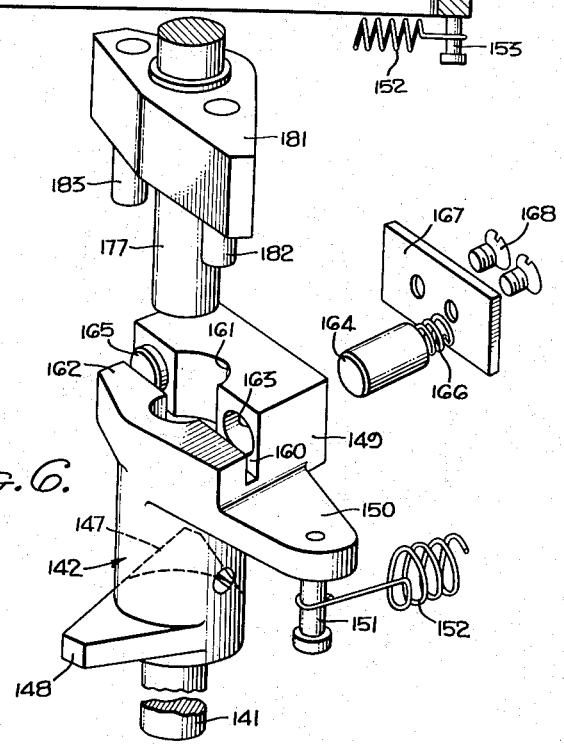

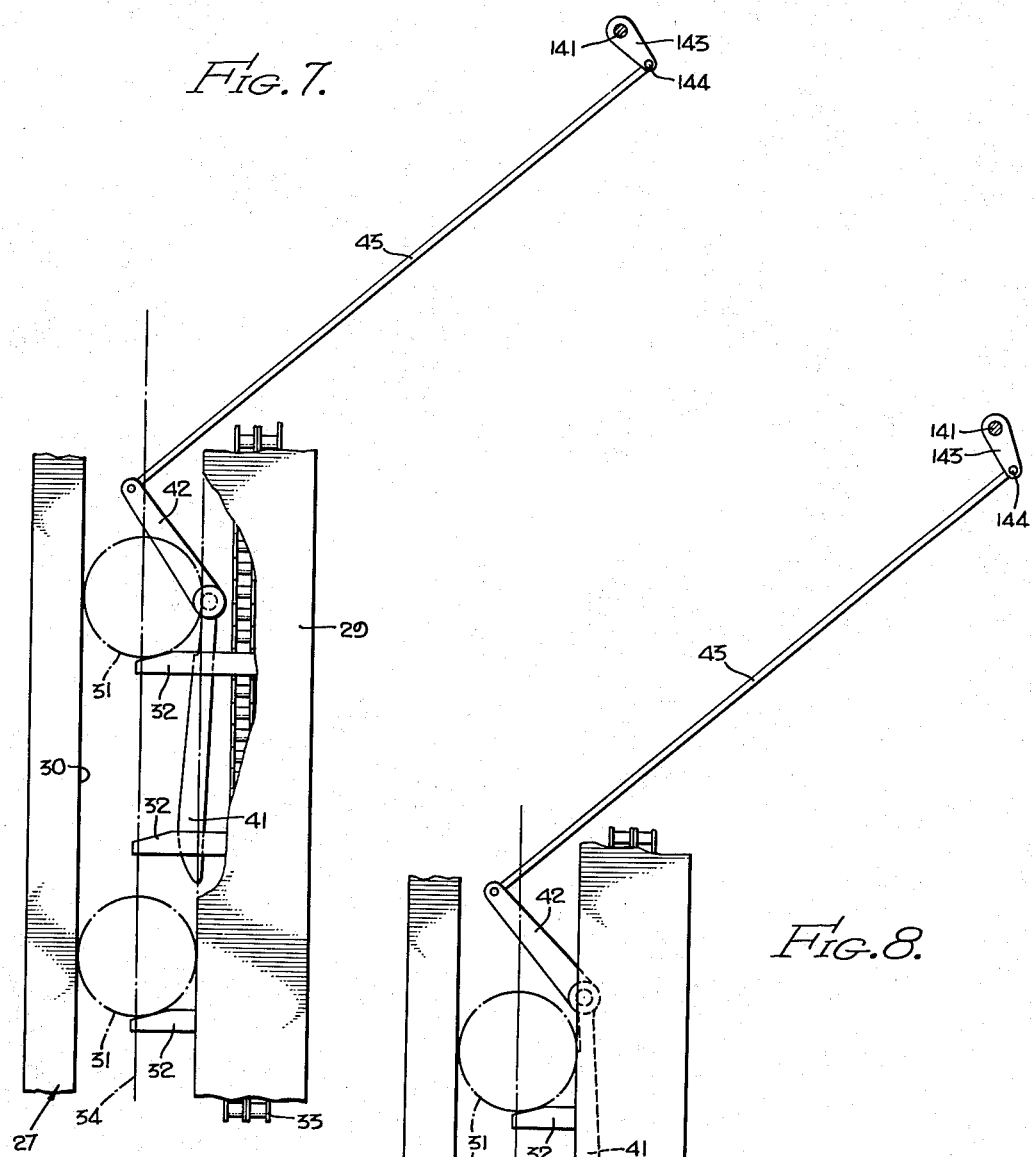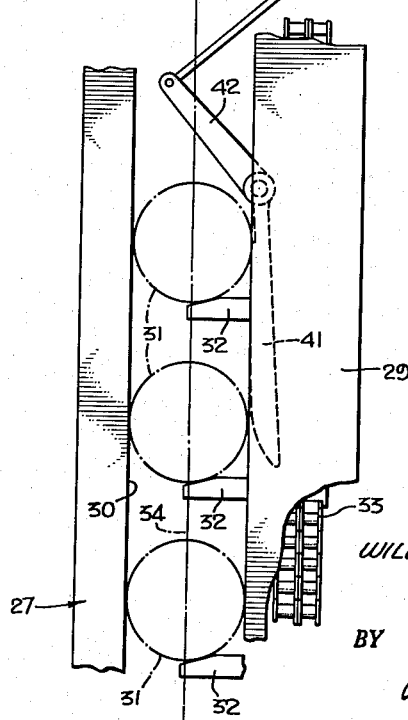

May 22, 1956 W. B. PETERSON, JR 2,746,413
CAN END FEEDER
Filed Dec. 24, 1951 8 Sheets-Sheet 5
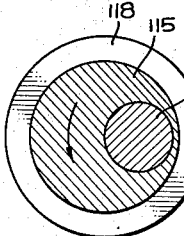
Fig. 9.
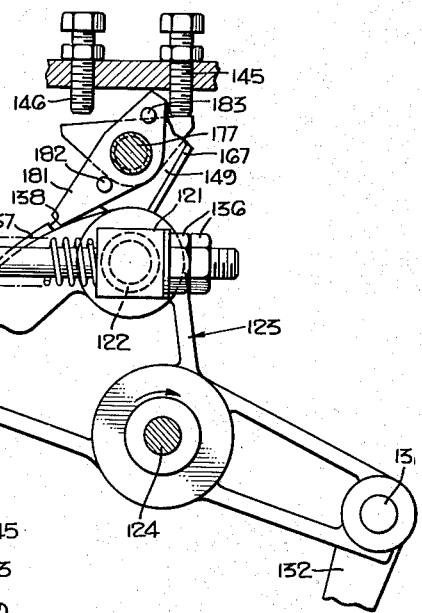
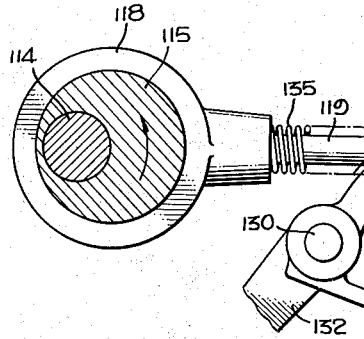
Fig. 10.
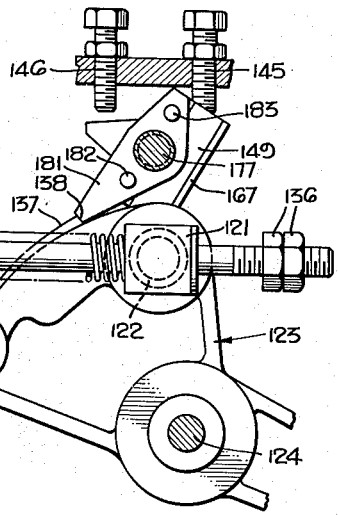
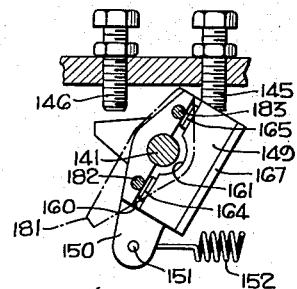
Fig. 11.
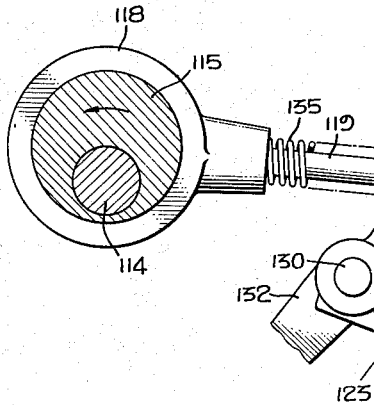
Fig. 12.
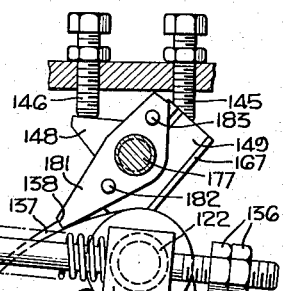
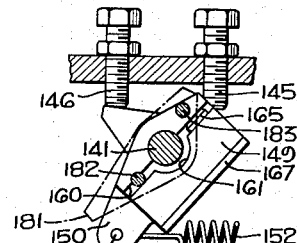
Fig. 13.
WILLIAM B. PETERSON, JR.
INVENTOR.
BY 
ATTORNEY May 22, 1956 W. B. PETERSON, JR 2,746,413
CAN END FEEDER
Filed Dec. 24, 1951 3 Sheets-Sheet 6
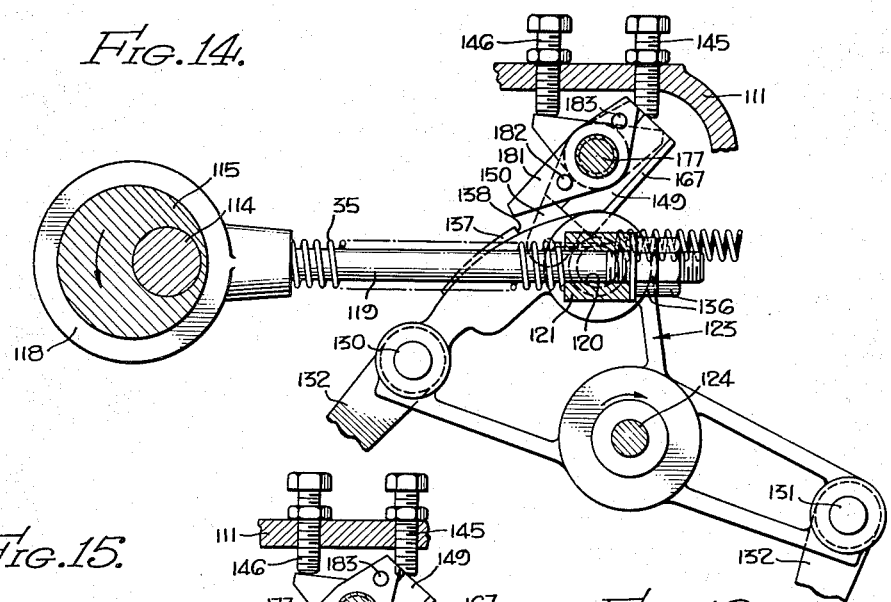
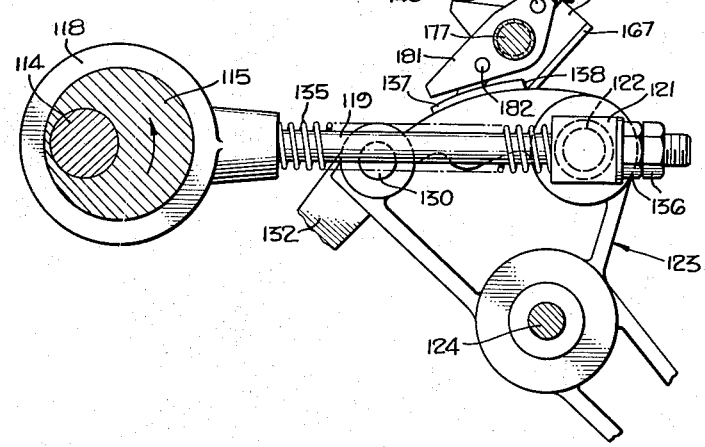
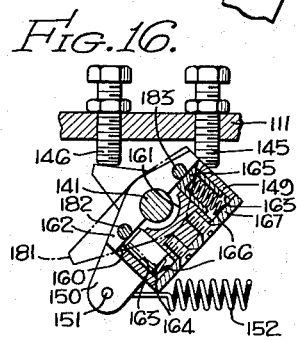
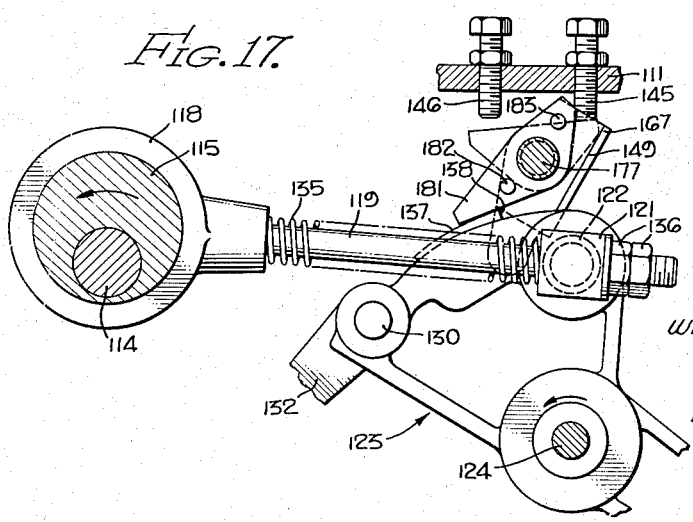
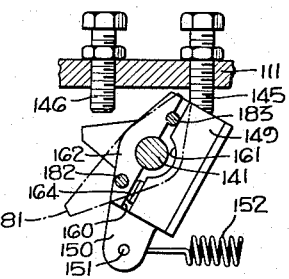
WILLIAM B. PETERSON, JR.
INVENTOR.
BY
ATTORNEY May 22, 1956 W. B. PETERSON, JR 2,746,413
CAN END FEEDER
Filed Dec. 24, 1951 8 Sheets-Sheet 7

WILLIAM B. PETERSON, JR.
INVENTOR.

BY

ATTORNEY

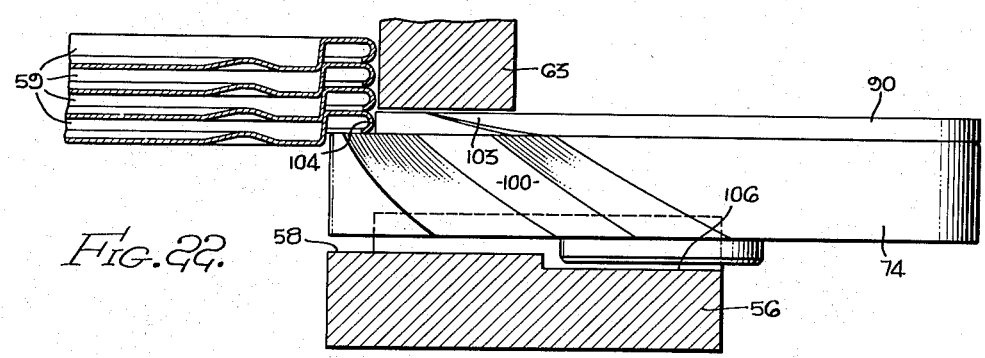
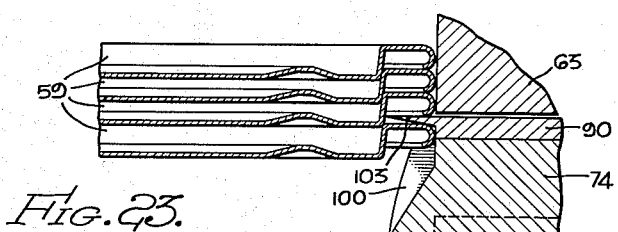
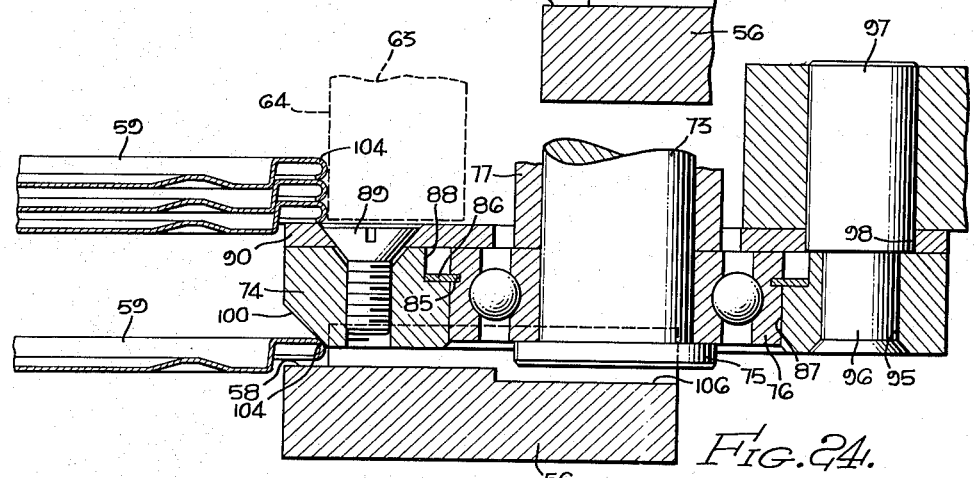
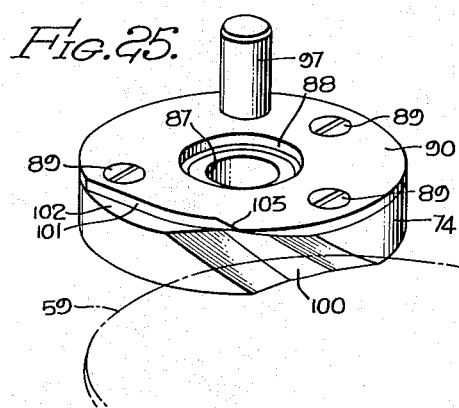
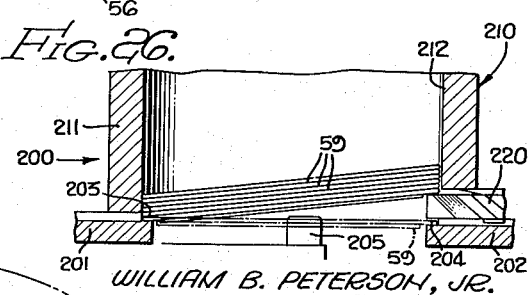
WILLIAM B. PETERSON, JR.
INVENTOR.

United States Patent Office 2,746,413
Patented May 22, 1956

2,746,413
CAN END FEEDER

William B. Peterson, Jr., Long Beach, Calif., assignor to Angelus Sanitary Can Machine Co., Los Angeles, Calif., a corporation of California Application December 24, 1951, Serial No. 263,052

9 Claims. (Cl. 113—114)

This invention relates to the individual feeding of flat elements from a stack of these in a magazine, and more particularly to the feeding of can ends to an applying machine in which said can ends are applied to can bodies.

In the double seamers generally employed in applying can ends to can bodies, conveyors are provided for conveying a series of can bodies and a series of can ends synchronously to a given point where said can ends are successively individually brought into assembled relation with said can bodies and the assembled bodies and ends are delivered to a seaming turret which produces a double seam between each assembled can end and can body. It is necessary for the satisfactory operation of such a double seamer that the can end should be fed to said assembly point only when the can body conveyor delivers a can body to said point. Inasmuch as the feeding of can bodies to a double seamer is often intermittent or in random groups, it is common practice to provide some means for rendering the can end feeding mechanism responsive to the delivery to the seamer of can bodies by the conveyor for feeding the latter.

The present trend of the canning industry towards higher speeds in the operation of can closing machinery has created problems in the operation of existing mechanisms for can end separating and feeding. Various solutions of these problems have been devised by manufacturers of such machinery but the resulting mechanisms have proven costly, complicated, and critical in adjustment.

It is a principal object of this invention to provide a simple mechanism for separating and feeding can ends under the conditions above noted that will be efficient at high operating speeds, non-critical in adjustment, and inexpensive to manufacture.

It is another object of this invention to provide a means whereby the can body being fed into the can end applying machine actuates a trip mechanism that is not critical in its related timing to operation of the can end separating device, and which, in effect, pre-sets the can end separating device so that the latter will separate and feed a can end at the proper time, for assembly with said cam body, and, in the absence of a can body being so fed, presets the can end separating device to render this inoperative to feed a can end.

In the feeding of can ends these are usually stacked in a vertical column in a magazine and the can ends are successively fed from the lower end of the stack of these, one can end at a time. It has been the practice in certain devices widely used in the past for feeding can ends successively from the lower end of a stack of these in a magazine, to support the lowermost can end by four single point contacts with the curled peripheral edge of the lowermost can end in said stack. This has sometimes resulted, when a substantial number of can ends are dropped at once into the magazine, in said curled edge of the lowermost can end being deformed at said points of support, which deformation tends to cause defective functioning of the deformed can end in subsequent operations in the can end seamer involving this can end.

It is a further object of the present invention to provide a can end feed device operating to feed can ends successively from the lower end of a vertical stack of these, and in which the stack of can ends in said magazine are supported by contact upwardly with a substantial portion of the curled edge of the lowermost can end.

Yet another object of the invention is to provide a can end feeding mechanism which will accommodate a considerable range of can end diameters and shapes and be convertible to change from handling one particular kind of can end to handling a different kind of can end merely by the replacing of a single element which is readily accessible for effecting this operation.

While the invention is disclosed herein as embodied in a particular structure incorporated with a specific type of can seamer, it is to be understood that this disclosure is for illustrative purposes only and that the invention is capable of embodiment in structures differing from that herein disclosed, and usefully associated with any of a wide variety of different types of equipment. It is also to be understood that while the present invention is disclosed herein as employed in the feeding of can ends from the lower end of a magazine to a can seamer, the invention is adapatable with relatively slight modification, and in some instances none at all, to the feeding of stacked objects of a substantially different character than can ends and it is therefore desired that the invention should not be considered as limited to the specific forms and uses disclosed but that these are subject to wide variation while still remaining within the spirit of the invention and the scope of the appended claims.

The manner of accomplishing the foregoing objects as well as further objects and advantages will be made manifest in the following description taken in connection with the accompanying drawings in which Fig. 1 is a diagrammatic, sectional view taken through a can double seamer at a level above the can body and can end feeding mechanisms thereof and illustrating a preferred embodiment of the present invention incorporated in said double seamer.

Fig. 3 is an enlarged, side elevational view taken in the direction of arrow 3 in Fig. 1 with portions of the housing broken away to illustrate elements normally hidden thereby.

Fig. 4 is an enlarged, vertical, sectional, detail view taken on the line 4—4 of Fig. 1 and illustrates the reciprocating spring device for actuating the can end feed rocker and the manner of driving said device.

Fig. 5 is an enlarged, vertical, sectional, detail view taken on the line 5—5 of Fig. 1 and illustrates the rocker restraining latch and the means for controlling the latter responsive to the presence or absence of a can body on the can body conveyor.

Fig. 6 is an enlarged, perspective, expanded view of the latch and control means shown in Fig. 5.

Figure 1:
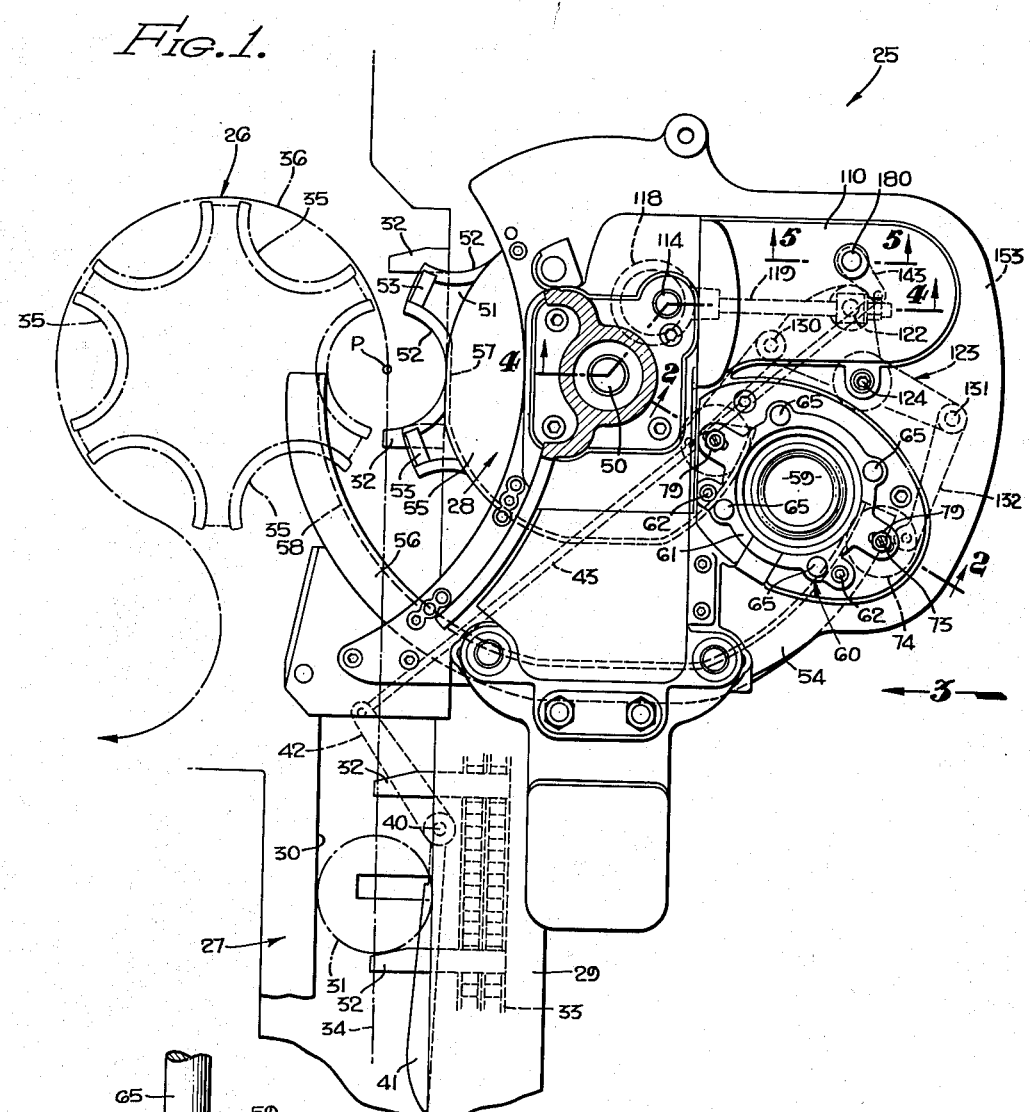

Fig. 7 is a diagrammatic plan view of the can body feeding conveyor of the invention and the can body responsive means associated therewith for controlling the can end feed mechanism with said means extending into the path of can bodies travelling on said conveyor due to the omission of one can body from the series of these normally fed along said conveyor. This view also illustrates a can body just as it moves out of engaging relation with said control means and another can body just before it engages said control means so as to actuate the same.

Fig. 8 is a view similar to Fig. 7 and illustrates the actuation by a can body of the means for controlling the can end feed mechanism to cause the latter to feed a can end to a point where this is delivered in assembled relation with said can body. In this view two can bodies are shown in engagement with said control arm, the uppermost of these cans being just about to move out of contact with said arm and the lowermost of these having just moved into contact therewith, the end feed mechanism being actuated by these two cans so as to successively feed two can ends into assembled relation with said two can bodies.

Fig. 9 is an enlarged, diagrammatic, fragmentary operational view of the can end feed actuating and control mechanism and is taken on the line 9—9 of Fig. 4. This view illustrates this mechanism with the parts thereof positioned at the beginning of a can end feeding cycle and with the control latch aforesaid positioned (by the absence of a can body opposite the control mechanism, as shown in Fig. 7) in front of the stop shoulder on the actuating rocker so as to prevent the feeding of a can end by the can end feed mechanism during the cycle of operation just starting.

Fig. 10 is a view similar to Fig. 9 illustrating the same parts disposed at the midpoint in said cycle of operation with the spring which normally actuates the rocker, compressed due to the rocker being held against rotation by said latch.

Fig. 11 is a detailed sectional view taken on the line 11—11 of Fig. 5 and illustrating the relationship of the latch aforesaid, which is here shown in broken lines, and the yieldable setting mount for said latch, when said parts are related as shown in Figs. 9 and 10.

Fig. 12 is a view similar to Fig. 10 and illustrates the reciprocating rocker actuator at a point where it has returned half way from the position in which this is shown in Fig. 10 towards the position in which it is shown in Fig. 9, and in which the yieldable latch setting mount is shown as having been rocked by engagement of the control therefor with a can body on the can body conveyor, so as to place a yieldable pressure against said latch tending to shift this out of locking relation with said rocker, which shifting is prevented by the friction existing at this moment between said latch and said rocker.

Fig. 13 is a view similar to Fig. 11 and illustrates the relationship between said latch (shown in broken lines) and said yieldable setting mount showing how one of the spring plungers in the latter applies a yieldable pressure against one of the pins on said latch to instantly rotate said latch out of engagement with the shoulder on said rocker as soon as said shoulder has shifted out of frictional engagement with said latch.

Fig. 14 is a view similar to Fig. 12 with the can end feeder eccentric rotated a quarter of a revolution further returning it to the same location where this is shown in Fig. 9, and which marks the end of the stroke at which said shoulder has moved out of engagement with said latch permitting the pressure exerted against the latter, as shown in Figs. 12 and 13, to swing the latch instantly out of obstructing relation with said shoulder.

Fig. 15 is a view similar to Fig. 14 and shows the spring actuated oscillation of the can end feeding rocker which takes place in the cycle immediately following the point illustrated in Fig. 14, by virtue of the latch now being removed from obstructing relation with the shoulder on the rocker.

Fig. 16 is a view similar to Fig. 13 and illustrates the relation between the latch and the yieldable latch mount which exists in Fig. 15 after the latch has been yieldably removed from obstructing relation with the rocker shoulder.

Fig. 17 is a view similar to Fig. 15 with the actuating eccentric position at a midpoint in its return stroke, with the latch yieldably pressed downwardly against the shoulder block of the can end feed rocker by a yieldable pressure imposed thereagainst by the yieldable latch mount by virtue of the latter having been rocked to the position in which this is here shown, by the absence of a single can body from the series thereof being fed along the can body conveyor.

Fig. 18 is a view similar to Fig. 11 but showing the latch rotated relative to the yieldable latch mount so as to cause the latch mount to impose a yieldable rotational pressure against said latch such as exists in Fig. 17 and which results, at the conclusion of the return stroke (the midpoint of which is shown in Fig. 17) in the latch rocking downwardly into obstructing relation with the rocker shoulder as soon as the latter has cleared said latch at the extremity of said stroke as shown in Fig. 9.

Figure 19:
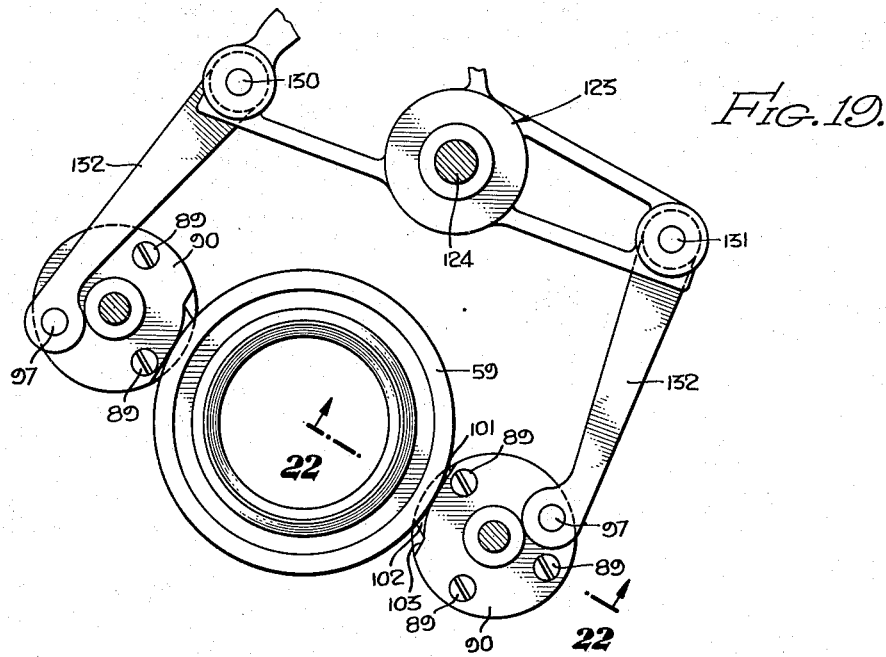

Fig. 19 is a fragmentary horizontal sectional view taken on the line 19—19 of Fig. 3 and illustrating the can end delivery discs positioned as at the beginning of each end feeding cycle.

Figure 20:
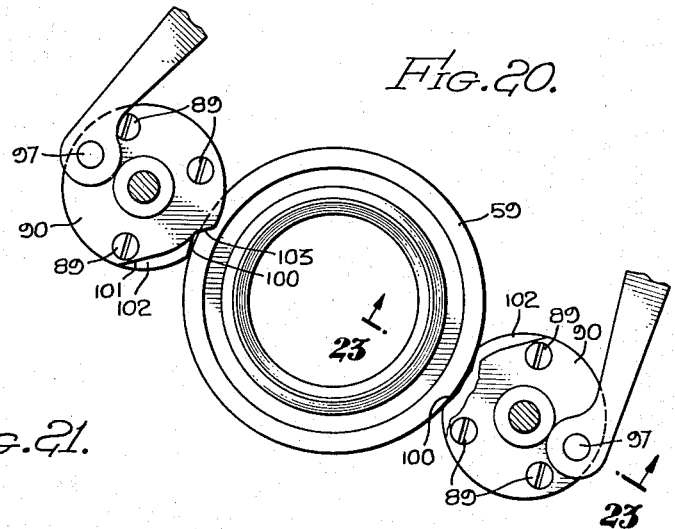

Fig. 20 is a view similar to Fig. 19 and illustrates said discs positioned as at the midpoint in the initial oscillatory movement of said discs during any given can end feeding cycle.

Figure 21:
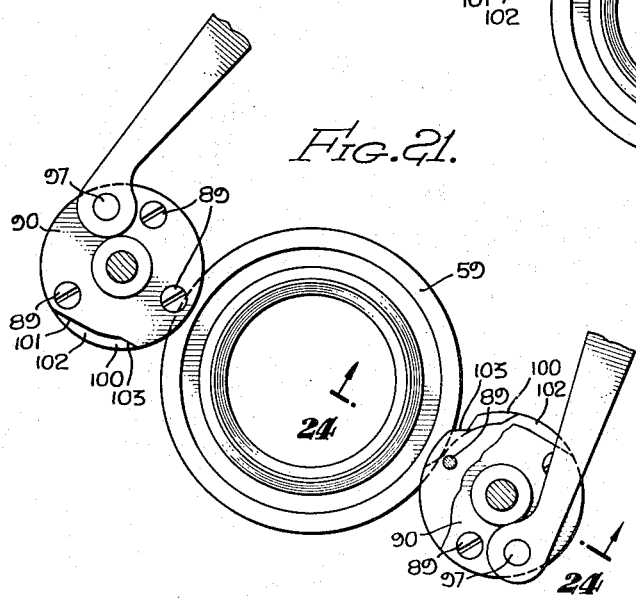

Fig. 21 is a view similar to Fig. 20 illustrating said discs at the conclusion of the initial oscillatory movement of each can end feeding cycle.

Fig. 22 is an enlarged, diagrammatic, vertical, sectional view taken on the line 22—22 of Fig. 19 and illustrates the manner in which the stack of can ends in the magazine is supported by the resting of substantial areas of opposite edge portions of the lowermost can end on shoulders provided on said feeding discs.

Fig. 23 is a view similar to Fig. 22 and is taken on the line 23—23 of Fig. 20 and illustrates the manner in which a knife on each of said feed discs penetrates between the lowermost can end in the magazine and the can end next thereabove in the first half of the initial oscillatory movement imparted to said discs in each can end feeding cycle. This view also illustrates the reception of opposite peripheral portions of the lowermost can end into deep helical grooves one of which is formed in the periphery of each of said discs, just below the knife of said disc.

Fig. 24 is a view similar to Fig. 23, being taken on line 24—24 of Fig. 21, and illustrates the manner in which the lowermost can end has been separated from the balance of the can ends in the magazine at the conclusion of the initial oscillatory movement of said discs in each can end feeding cycle, with the delivery of said lowermost can end downwardly from between said discs with the opposite edge portions of said can end resting on arcuate guide tracks for guiding the can end to the point where it is assembled with a can body.

Fig. 25 is a perspective view of one of the can end delivery discs of the invention with the can end supporting shoulder, the can end dividing knife, and the helical can end feeding groove turned directly towards the observer, and showing in broken perspective, a can end fitting into said groove as said can end is conveyed downwardly while being retained in horizontal position by the concerted oscillation of said discs while disposed in oppositely pitched engagement with diametrically opposite portions of the periphery of said can end.

Fig. 26 is a diagrammatic fragmentary vertical sectional view similar to Fig. 22 and illustrating a modified form of the can end feeder of the invention in which ends are individually separated from a lower end of a stack of these in the can end magazine by a single oscillating disc.

Referring specifically to the drawings, a portion of a double seamer 25, with which a preferred embodiment of the present invention is incorporated, is shown in Fig. 1. This seamer includes a seaming turret 26 for uniting can bodies and can ends delivered concurrently to a point P, the can bodies being delivered to said point by a can body conveyor 27 and the can ends being delivered thereto by a can end conveyor 28. As the mechanism for operating the turret 26, can body conveyor 27 and can end conveyor 28 in timed relation to perform their functions aforesaid is well known in the prior art, a detailed reference to said mechanism is unnecessary in the present disclosure.

The can seamer 25 has a frame 29 upon which the various elements of said seamer are mounted. The can body conveyor 27 includes a runway 30 along which can bodies 31 are propelled by fingers 32 which are carried on an endless chain 33 mounted on said frame. The can bodies 31 are thus caused to travel along a path indicated by a broken line 34 (Fig. 1) until the center axis of each can body coincides with point P. Here the can is embraced by one of the arcuate recesses 35 provided in the turret 26 and overlies one of a series of cam actuated elevator tables (not shown) which is mounted on the turret 26.

Each of these tables is of a size and shape to receive a single can and support this in place in the turret 26 to cause the can to revolve with said turret to follow a path indicated by broken line 36 in its travel beyond point P. While for illustrative purposes the can body conveyor 27 is shown as being of the type which feeds the body along a straight line to the seaming turret 26, it is to be understood that other types of can body feeders may be employed for feeding the body to the turret 26 with equal facility. For instance, rotary can body feeders are employed to perform this function in many can seamers.

Mounted in suitable bearings (not shown) on the frame 29 beneath the runway 30 of the can body conveyor 27 is a short vertical shaft 40 (Fig. 1). Fixed on the upper end of said shaft is an arm 41 which normally extends up through a hole in the can body runway 30 of the conveyor 27 so that when a can body travels along said runway said arm is engaged by the latter and is swung out of said runway as shown in Fig. 8. The shaft 40 extends downwardly below the conveyor 27 where it is provided with an arm 42 the outer end of which pivotally connects to a pitman rod 43 (Figs. 1, 3, 7 and 8). When a can body engages the arm 41 to shift this from the position in which it is shown in Figs. 1 and 7 to the position in which it is shown in Fig. 8, the arm 42 is caused to rock through a corresponding angle for a purpose which will be made clear hereinafter.

Figure 2:
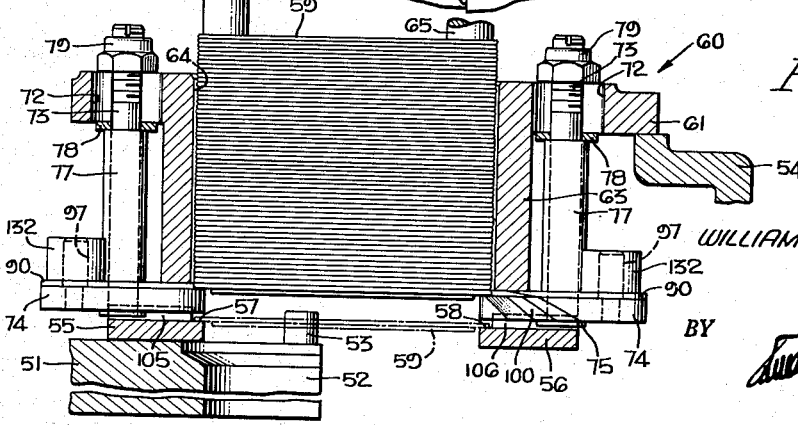
Fig. 2 is an enlarged, vertical, sectional detail of the can end separating mechanism taken on the line 2—2 of Fig. 1.

The can end feed conveyor 28 includes a vertical drive shaft 50 which is journalled in suitable bearings provided on the frame 29. Mounted concentrically with the shaft 50 but driven at a substantially lower rate of speed by the drive mechanism of the seamer is a feed rotor 51, the latter being provided with arcuate recesses 52 and carrying can end pushers 53 which extend upwardly from said rotor (Figs. 1, 2 and 3). The timed relation between the rotation of the rotor 51 and the turret 26 causes one of the recesses 52 to always be presented in matching relation with a corresponding recess 25 of the turret 26 when a can body has arrived at point P so that this can body is held in its proper relation with the turret 26 while the elevator rises therebeneath to trap the can body in this position relative to the turret 26 and lift the same incidental to the performance of the seaming operation. This takes place while said can body and a can end assembled therewith continue along the path 36 on the turret 26 (Fig. 1).

The can end feeder 28 is provided with a housing 54 which is mounted on the frame 29 (Figs. 1 and 3) and which has supported on its undersurface inner and outer can end tracks 55 and 56. Opposed edges of these tracks are uniformly spaced apart and provided with guide ways 57 and 58, respectively, which receive diametrically opposite edge portions of a can end 59 so that the latter may be rapidly propelled by one of the pushers 53 along the path defined by said tracks from a can end magazine 60 to the point P.

The magazine 60 includes a magazine base 61 which is secured as by cap screws 62 to a flat upper face of the housing 54 and has a neck 63 formed on the base 61 and extending downwardly therefrom through a suitable opening in the housing 54, this neck being shaped to conform to the outline of can ends 59 which the magazine 60 is designed to hold. Where these can ends are circular, which is generally the case, the neck 63 is cylindrical (Figs. 2 and 3). The neck 63 has a bore 64 (Fig. 2) which is shaped to receive said can ends. Suitable vertical holes are provided in the base 61, about the bore 64 for receiving rods 65 which guide a stack of can ends 59 into the bore 64 of the magazine 60.

While the invention is disclosed herein as operating to feed circular can ends, it is adaptable with slight modification to feed can ends of non-circular outline which may be rectangular, oval or of irregular shape as used in the formation of cans for containing a whole ham. The seamer 25 of course has to be large enough to handle the particular size and shape of can ends fed thereto by the invention. The neck 63 also must be shaped to neatly accommodate and vertically guide a stack of such can ends to the mechanism for feeding individual can ends from the bottom end thereof said mechanism which is located at the lower end of said neck, to be described hereinafter. It is to be further understood that in its broader aspects, the feeding mechanism of this invention may be used to handle any kind of objects capable of being stacked and fed individually from this assembled relation by the feeding mechanism, the function of the latter being to separate the endmost article from the balance of the stack of these so that each may be fed individually to a point where it is to be used.

For reasons which will become apparent later, the invention is of particular utility in feeding individual articles from a stack of these when the individual articles have a nesting relation with each other and it is necessary to make a substantial axial separation of each endmost article from the balance of these, and moving the endmost article away from the stack and then along a path lying in the plane of said article. In other words each article must be moved out of its nesting relation with the remaining articles before the separated article may be moved in the plane thereof relative to the balance of the stack.

Provided in opposite end portions of the can end magazine base 61 are slots 72 for receiving bolts 73 on the lower ends of which are mounted a pair of can end separating discs 74. These discs being identical, a description of one will suffice for both.

The lower end of each of the bolts 73 has a flat head 75 which supports the inner race of a ball bearing 76 surrounding this bolt 73. This bearing is trapped in this position by a sleeve 77 which also surrounds the bolt 73 and is capped by a washer 78 which cooperates with a nut 79 screwed onto the upper end of said bolt to fix the bolt 73 and the disc 74 mounted thereon in any selected position within the slot 72 through which said bolt extends.

The outer race of bearing 76 has a radial slot 85 for receiving a split washer 86. The feed disc 74 assembled on said bearing has a bore 87 into which said outer race slips and a counter bore 88 which receives the washer 86. Secured to the upper face of the disc 74 by screws 89 is a knife plate 90 which is centrally apertured to overlap the outer race of bearing 76 and freely receive the sleeve 77. Each disc 74 has a hole 95 which receives a portion of reduced diameter 96 of a pin 97 which is swaged at its end as shown in Fig. 24 to secure said pin in place on said disc. A suitable hole 98 is provided in plate 90 to accommodate said pin.

Formed in the periphery of the disc 74 at a point diametrically opposite the location of the pin 97 in said disc is a deep V-shaped helical thread 100 with a very high pitch, the purpose of which will be made clear hereinafter. Formed in the knife plate 90 and slightly overlapping the thread 100 is a relatively long notch 101, said notch uncovering an area 102 of the upper face of the disc 74 which areas are adapted to serve as supporting faces for a stack of can ends 59. The end of notch 101 which overlies the thread 100 is bounded by a short steep edge 103 which is sharpened from beneath to form a knife edge lying substantially in the plane of the upper surface of the plate 90. The plate 90 is preferably of approximately the same thickness as the vertical thickness of a peripheral edge portion 104 of one of the can ends 59.

The upper faces of can end tracks 55 and 56 are cut away to provide recesses 105 and 106 into which feed discs 74 extend downwardly so that the lower faces of said discs lie disposed closely above the bottom faces of guide ways 57 and 58 provided in said tracks (Figs. 1, 2, 22 and 24).

The discs 74 are so mounted (Fig. 2) that they are able to oscillate on the bearings 76 with the upper faces of the knife plates 90 disposed close beneath the flat lower end of the tubular magazine neck 63. Thus when a stack of can ends 59 is fed downwardly by the magazine 60 through the neck 63, this stack of ends is received on the disc faces 102 when the discs are in their normal positions of rest as shown in Fig. 19. The manner in which individual can ends 59 are successively fed downwardly from the magazine 60 by oscillation of the discs 74 will be made clear hereinafter.

The housing 54 also has a cap 110 secured on an upper face thereof and a bearing bracket 111 secured to a lower face thereof. Provided in the housing 54 is a vertical bearing 112 while cap 110 has a bearing 113 coaxially aligned therewith. Fixed in these bearings is a vertical shaft 114 on which an eccentric 115 having a gear 116 fixed thereon is rotatably mounted. Meshing with the gear 116 is a gear 117 which is fixed on and driven by the shaft 50. Rotational movement in timed relation with rotor 51 is thus transmitted to the eccentric 115, the latter being provided with a band 118 having a rod 119 mounted thereon (Fig. 4).

This rod extends through a hole 120 in the head 121 of a pivot pin 122 which is pivotally mounted in a rocker 123 which is mounted on and adapted to rock about a shaft 124 which is fixed at its upper end in the housing 54 (Fig. 3). The rocker 123 also has pins 130 and 131 which are disposed on axes diametrically equidistant from the axis of the shaft 124. Pivotally mounted on the pins 130 and 131 are rocker arms 132 which are suitably apertured at their outer ends to pivotally receive the pins 97 provided on can end feed discs 74 (Fig. 19).

Surrounding the rod 119 is a coiled compression spring 135 which is maintained under compression by a pair of lock nuts 136 applied to the threaded outer end of said rod. The rocker 123 is provided with a latch supporting block 137 having a latch engaging shoulder 138 at one end thereof.

It is thus seen that the reciprocating movement of the rod 119 produced by the rotation of the eccentric 115 is transmitted through the spring 135 and block 121 to the rocker 123 to rock the latter between the position in which this is shown in Fig. 14 and the position in which it is shown in Fig. 15 thereby transmitting an oscillatory movement to the feed discs 74 through the links 132 so as to cause the feeding of a can end downwardly from the magazine 60 onto the guide ways 57 and 58 of the guide tracks 55 and 56. The manner in which this feeding takes place is illustrated in Figs. 19 to 25, inclusive.

As above stated, when the discs 74 are in their normal inactive positions as shown in Fig. 19, the stack of can ends 59 rests upon the shoulders 102 of said discs. These shoulders are of ample area to strongly support the stack of can ends so as to prevent damage being done to the peripheral lip of the lower can end by the operator dropping a substantial stack of can ends at a single time into the magazine 60.

By virtue of the fact that the plates 90 are equal in thickness to the peripheral portion of an individual can end, the initial portion of the oscillatory movement of the disc 74 causes the knives 103 to be inserted between the lowermost can end in the magazine and the can end immediately thereabove. Simultaneous with this insertion of the knives 103 between these two can ends so that the weight of all the can ends in the magazine except the lowermost of these is transferred onto the knives 103, the upper ends of the deep threads 100, formed in the discs 74, come opposite the diametrically opposed peripheral portions of the lowermost can end which previously had rested on the shoulders 102 so that these portions of said can end are no longer supported by said shoulders whereby said can end is fed downwardly while guided by the oppositely pitched opposed walls of the threads 100 thereby maintaining the lowermost can end 59 in horizontal position as it is lowered with the diametrically opposite portions aforesaid resting upon the guide ways 57 and 58.

At the completion of the initial oscillation of the discs 74 in a common direction as shown in Fig. 21, the lowermost can end has been fed downwardly so as to rest on the tracks 55 and 56 in the guide ways 57 and 58, directly in the path of one of the travelling pushers 53 which immediately contacts the can end thus fed from the magazine 60 and shifts it rapidly along the path outlined by tracks 55 and 56 until this can end arrives at the point P where, as previously noted, it is assembled with a can body delivered to said point by the can body conveyor 27.

As the eccentric 115 is rotated in timed relation with the other elements of the seamer 25 so as to feed a can end from the magazine 60 to the point P at the exact instant each can body is delivered to said point by the conveyor 27, there would be no need for the rest of the mechanism of the present invention if it were not that the can body conveyor 27 is not always kept supplied with can bodies while the seamer 25 is operating. It is thus necessary to provide a means for preventing the feeding of a can end to point P when no can body is fed to said point to be assembled with such a can end. The preferred mechanism provided by the invention for this purpose will now be described.

The bearing bracket 111 includes a bearing 140 in which a vertical shaft 141 journals, this shaft having a latch mount 142 fixed on the upper end thereof and a short arm 143 fixed on the lower end thereof, the tip of which is provided with a ball and socket connection 144 by which the extremity of link 43 is connected pivotally with said arm. The bracket 111 also has a pair of adjustable stop screws 145 and 146 mounted therein (Figs. 3, 5 and 9).

The latch mount 142 has lugs 147 and 148 extending therefrom in positions to be alternately brought into engagement respectively with screws 145 and 146 thereby permitting a limited rocking movement to the mount 142. The mount 142 has a block shaped head 149 from which an arm 150 extends laterally, said arm having a pin 151 to which one end of a contractile spring 152 connects. The opposite end of said spring is hooked around a suitable pin 153 which extends downwardly from the housing 54 (Figs. 1 and 4).

The head 149 has a kerf 160 extending across the same and a vertical bore 161 which intersects said kerf and is aligned with shaft 141. On one side of said kerf the head 149 is shortened to provide a plunger stop wall 162. Provided in the head 149 opposite said wall are horizontal bores 163 which contain hollow spring pressed plungers 164 and 165. Springs 166 are trapped in said plungers by a plate 167 which is secured to the back face of the head 149 by screws 168.

Extending downwardly through a hole 175 in the cap 110 and a hole 176 provided in the housing 54 is a latch pivot shaft 177 which has a threaded upper portion 178 on which nuts 179 and 180 are screwed in mounting shaft 177. Holes 175 and 176 are coaxially aligned with the bearing 140 so that shaft 177 is adapted to extend into bore 162 of the latch mount 142. Freely pivoted on the shaft 177 and resting directly on top of the block 149 of the latch mount 142 is a latch 181 having pins 182 and 183 extending downwardly therefrom to a level close above the wall 162 of the head 149. As clearly shown in Fig. 6 this wall is at a level which uncovers upper halves of the plungers 164 and 165 and the pins 182 and 183 are disposed directly in front of and normally in contact with said plungers. Thus if there is any rotational movement of the mount 142 relative to the latch 181 or vice versa, this results in a slight movement of one of the plungers 164 or 165 and a further compression of the spring 166 contained therein so as to exert a yieldable torque pressure against the latch 181 until the latter is free to respond to said pressure and resume its normal rotational relation with the mount 142 in which both pins 182 and 183 lightly contact the plungers 164 and 165 with the latter impelled by their springs 166 into pressural engagement with the wall 162 (Fig. 16).

*Operation*

The invention comprises a no-can-body, no-can-end mechanism which, as above described, is embodied in the can seamer 25 to assure that when there is a gap in the series of can bodies 31 fed along the can conveyor 27, there will be a corresponding gap in the series of can ends 59 fed along the can end conveyor 28. This assures that no can end will be delivered to the point P (Fig. 1) for assembly with a can body when there is no can body there to receive said can end.

The can bodies 31 are propelled along the runway 30 of the can body conveyor 27 by conveyor fingers 32 and the latter move in timed relation with the rotation of the can end conveyor rotor 51 so that, under normal operation, a single can body and a single can end are repeatedly delivered coincidentally to point P for assembly together as they proceed in superimposed relation about the seaming turret 26.

The invention includes four springs 135, 152, and 166—166, and the relative functioning of these springs determines the novel mode of operation of the invention by which it achieves the objects aforesaid. To begin with, spring 135 (Fig. 9) is interposed between the continuously reciprocating eccentric 115 and the oscillatable rocker 123 so as to compress the head 121 (pivotally mounted on said rocker) between said spring and nuts 136 (provided on the end of the rod 119 on which spring 135 is mounted). In this manner the reciprocatory movement of the band 118 (surrounding eccentric 115 and on which rod 119 is fixed) is transmitted through head 121 to the rocker 123 so as to cause the latter to oscillate about the shaft 124 in exact timed relation with the rotation of shaft 114 carrying eccentric 115. This shaft, it will be remembered, rotates once during each time interval between the delivery of successive can bodies and can ends to point P. Being connected by arms 132 to the can end feeding disks 74, the rocker 123 oscillates said disks, with each such oscillation of the rocker, to feed a can end 59 from the magazine 60 to the can end conveyor 28.

Spring 152 connects to pin 151 on arm 150 provided on latch mount 142 which is fixed to shaft 141 (Figs. 6, 7, and 8), and constantly applies a yieldable torque to shaft 141 tending to rotate this shaft to swing arm 143 (which is connected through link 43 to arm 42 which is fixed on shaft 40 with can-engaging arm 41), so that whenever a can body 31 is not disposed in the runway 30 of the conveyor 27 in a position to engage arm 41, and swing said arm out of said runway, arm 41 is swung into said runway, as shown in Fig. 7, by said torque imposed by spring 152 on shaft 141.

Whenever a can body 31 is disposed in runway 30 opposite arm 41, the latter is swung out of said runway, as shown in Fig. 8. This imparts a clockwise rotational movement of about 15° to shaft 141 which is in opposition to the yieldable torque applied by spring 152 to said shaft (Fig. 6).

Shaft 141 thus has a primary rotational position (shown in Figs. 8, 13 and 16) which occurs whenever and as long as arm 41 is held out of conveyor runway 30 by the presence of a can body 31 opposite said arm. It also has a secondary rotational position (shown in Figs. 7, 11 and 18) which occurs whenever arm 41 is allowed to swing into the can body feed runway 30 (Fig. 7) by the absence of a can opposite said arm which will hold the latter out of said runway.

So long as shaft 141 is in its primary rotational position just referred to, an endless uniformly spaced series of can bodies 31 is being delivered along the runway 30, each can body being propelled along said runway in advance of one of the conveyor fingers 32 with said can bodies close enough together so that before each one of said can bodies leaves contact with the arm 41, the next can body in said series has arrived in a position to contact arm 41 and hold it out of runway 30 after said preceding can body has parted contact with said arm.

The present invention is particularly provided for the purpose of performing the no-can-body, no-can-end function when can bodies and ends are fed to a can seamer at a very high rate of speed. For instance, the machine illustrated herein is adapted to (and does commercially, at peak loads) handle over 600 can bodies a minute. Thus, over ten can bodies 31 pass the arm 41 in travelling into the seamer 25 during each second of operation. When a single can is omitted from an otherwise continuous series of can bodies 31 being fed along the runway 30 to the seamer 25, only two-tenths of a second elapses during the travel of the can body 31, immediately following said gap, into the position of the can immediately preceding said gap. Because of the length of arm 41, a still much shorter interval of time is available for said arm to swing into said gap (as shown in Fig. 7) under the preloading of yieldable torque applied to arm 41 by spring 152 (through the various elements connecting said spring to said arm).

Spring 152 must, therefore, be made to apply sufficient torque to shaft 141 to cause the movement of arm 41 to its extended position shown in Fig. 7 in about one-fortieth of a second. This rapid movement of arm 41 is required because this arm must remain extended into runway 30, as shown in Fig. 7, long enough to condition the can end feed operating mechanism to restrain said mechanism from actuating the can end feed so that this will not feed a can end to the conveyor 28 and thereby produce a gap in the series of can ends being delivered to point P corresponding to the gap above referred to in the series of can bodies being fed to said point. This action for coordinating the feeding of can ends with the feeding of can bodies so that a gap in the latter is accompanied by a corresponding gap in the former is accomplished in the following manner.

As above stated, when there is no interference with the rocking of rocker 123 this is oscillated continuously through spring 135 in timed relation with the rotation of the shaft 114 and eccentric 115 which in turn rotate in timed relation with can body conveyor 27 and can end conveyor 28 so that a continuous series of can ends is fed by the can end feed means to said can end conveyor.

The rocker 123 is left free to oscillate so long as shaft 141 is in its primary rotational position (due to arm 41 being maintained constantly out of runway 30 by the unbroken character of the series of can bodies 31 being fed along said runway, as shown in Fig. 8). When the shaft 141 is in said primary position, the lug 148 (Fig. 6) on the shaft 141 engages stop screw 146 (Fig. 13) to limit the clockwise rotation of shaft 141 to said primary position (shown in Figs. 8, 13 and 16). Lug 148 is also shown contacting screw 146 (to stop clockwise rotation of shaft 141 with the latter in its primary position) in Figs. 12, 14 and 15. If the series of can bodies 31 being fed to seamer 25 is continuous, shaft 141 remains in its primary position with the lug 148 held against the screw 146 and due to the position of the spring-pressed plug 164 adjacent the pin 182 of the latch 181, the latter is held free from engagement with rocker 123, as shown in Figs. 14, 15, and 16.

When a gap occurs in the series of can bodies 31 fed along the runway 30, as shown in Fig. 7, resulting in shaft 141 being rotated in a counter-clockwise direction (about 15°) to its secondary position as shown in Fig. 9, this withdraws lug 148 from engagement with screw 146 and swings lug 147 into engagement with stop screw 145. This rotation of shaft 141 swings latch 181 toward the rocker 123, and, in the timing of the machine, this occurs with the peripheral block 137 of the rocker 123 underlying the latch 181 (as shown in Fig. 17) while the rocker 123 is on the return stroke of a can end feeding oscillation cycle.

As above stated, rotation of shaft 141 to its secondary rotational position is accomplished by torque applied to said shaft by the spring 152, and this torque is sufficient, when the rotation of the latch 181 with shaft 141 is temporarily obstructed by the block 137 underlying the latch 181 (Fig. 7), to compress the spring 166 in the plunger 165 (bearing against pin 183 on latch 181, as shown in Fig. 18). Spring plunger 165 thus imposes a yieldable torque on the latch 181, pressing said latch against said block and causing said latch to snap in behind shoulder 138 at the very instant block 137 moves out from beneath said latch. This action is illustrated in Fig. 9.

The purpose of latch 181 shifting into the return path of shoulder 138 is, of course, to prevent rocker 123 being oscillated by the immediately following reciprocation of rod 119 so that, during that particular can end feeding cycle, there will be no can end fed from the magazine 59 to the can end conveyor 28. This result is assured by the relatively short interval that it is necessary for shaft 141 to remain in its secondary rotational position during a particular can body delivery cycle in order to assure that no can end will be fed during the corresponding can end delivery cycle.

For instance, it is only necessary for shaft 141 to remain in its secondary position until the shoulder 138 returns into pressurable engagement with the tip end of the latch 181 by the starting of the next oscillatory cycle of the rocker 123. This engagement creates enough friction between the shoulder 138 and the latch 181 so that when shaft 141 is returned (almost immediately afterward) to its primary rotational position by engagement of the next can body 31 with the arm 41, the latch 181 does not rotate with the shaft 141 but remains in stopping relation with the shoulder 138 thereby continuing to hold the rocker 123 against oscillation. This is made possible by the provision of the spring plunger 164 which is depressed by the engagement therewith of pin 182 on the latch 181, as shown in Fig. 13, to permit shaft 141 to return to its secondary rotational position (see Fig. 12) while the latch 181 remains held in its rocker stopping position by the frictional pressure of shoulder 138 against said latch.

The yieldable pressure of spring plunger 164 against the latch 181, however, preloads the latch 181 with a rotational torque which operates immediately, upon the relaxation of the pressure of the shoulder 138 against said latch, to snap the latter into outward position, as shown in Fig. 14. The rocker is thus freed to resume its regular oscillatory movement, and timely feeding of can ends to the can end conveyor 28.

By reference to Fig. 17, it may be noted that in spite of the very rapid action required of the present invention in performing the no-can-body, no-can-end function, the timing of the mechanism performing this function in relation to the can body feed conveyor is not highly critical.

This is because when the latch 181 is first swung against the block 137, as shown in Fig. 17, it merely rides on this block and the latch is spring-pressed against said block during the balance of the current cycle of oscillation of the rocker 123. As this cycle terminates (Fig. 9) the latch 181 snaps into the return path of shoulder 138 with extreme rapidity because of the relatively small mass of the latch 181 and the fact that this is the only element, movement of which is required. Furthermore, the latch must move only a very short distance, as the shoulder 138 moves out from under the latch 181, in order for said latch to be positioned, as shown in Fig. 9, in the return path of said shoulder.

For like reasons, the latch 181 withdraws rapidly from its position in the path of the shoulder 138, following a cycle in which no can end is fed, by virtue of the fact that latch 181 alone needs to be moved to withdraw it from obstructing relation with the shoulder 138 and because it need move only a short distance to reach its non-obstructing position.

It is likewise of importance that in each of these movements of the latch 181 into the path of the shoulder 138, and out of the path of said shoulder, said latch is preloaded by a substantial spring pressure imposed thereagainst by one of the spring loaded plungers 164 or 165. There is thus practically no delay following the release of latch 181 from restraint by its frictional engagement with block 137 and the arrival of said latch, either in obstructing relation with the shoulder 138, or in the retracted position of the said latch, shown in Fig. 14.

Another important factor in the operation of the invention is the focusing of the critical action of the latch 181 in a concluding portion of a cycle of oscillation of rocker 123 (and of reciprocation of rod 119) where a substantial interval of time is available for the movement of the latch 181, into or out of the path of shoulder 138, due to the change of direction of movement of the rocker 123 taking place during said interval and the relatively low speed at which said rocker moves during said interval because of the eccentric 115, during said interval, travelling over dead center.

As far as the timing of the initial rotation of shaft 141 into its secondary position, in order to halt oscillation of rocker 123 is concerned, this may and preferably does occur before the block 137 is out from beneath the latch 181, as shown in Fig. 17, and this rotation of shaft 141 for its intended purpose may occur at any time during the closing portion of an oscillation cycle of rocker 123 and before the next cycle of oscillation of said rocker begins.

On the other hand, the return rotation of shaft 141 from its secondary rotational position to its primary rotational position may take place any time during said cycle of thwarted oscillation of the rocker 123 so long as it does not start before the shoulder 138 comes into head-on frictional engagement with the nose of latch 181. No matter when said shaft 141 returns to its primary rotational position, therefore, after the stop shoulder 138 has thus engaged latch 181, said latch will be quickly snapped to its retracted position, shown in Fig. 14, by the action of spring plunger 164, at the very instant, following the return of shaft 141 to its primary position, that shoulder 138 first withdraws from frictional head-on engagement with latch 181.

The importance of this characteristic of the invention, in that the timing of the actuation of the latch 181 by the arm 41 is not highly critical, is to be seen in the fact that the seamer 25 in commercial operation must be adaptable to handling cans varying substantially in diameter so that there is an unavoidable variation in the timing with which arm 41 is actuated by can bodies which differ in diameter.

In Fig. 26 a modified can end feeder 200 of the invention is shown which includes tracks 201 and 202 having guide ways 203 and 204 for guiding separate edges of can ends fed therealong. The feeder 200 also has a series of pushers 205 which traverse the path between the guide ways 203 and 204 and each extending a slight distance above the level of these so as to engage a can end fed downward to lie flat on the guide ways and propel this along the tracks 201 and 202 to the point P previously indicated.

The feeder 200 includes a magazine 210 the neck 211 of which has a bore 212 for receiving a stack of can ends 59. The lower end 213 of the neck 211 is nonperpendicular to the axis of the neck so that on one side, the lower end of neck 211 engages the upper face of the track 201 while the opposite side of lower end 213 of said neck is spaced upwardly from the track 202 to admit a can end separating disc 220 in the structure, mounting, and operation of which are the same as in the discs 74 heretofore described.

As clearly indicated in Fig. 26, each pusher 205 bypasses the lowermost can end 59 in the magazine 210 as long as one edge of said can end rests upon the disc 220 as shown in this view. A single oscillation of the separating disc 220, however, causes the separation of the said lowermost can end from the stack of these in the neck 211 and delivers the edge of said can end which previously rested on the upper face of the disc 220, downwardly onto the guide way 204. This brings said lowermost can end into the path of the next pusher 205 passing underneath the neck 211 so that said pusher engages said can end and feeds it along the tracks 201 and 202 to the point P where it is assembled with a can body 31.

I claim:

1. In a feeder for can bodies and ends therefor, the combination of: a conveyor for feeding can bodies consecutively in a given timed relation to a point at which a can end is to be assembled with each of said bodies; a conveyor for delivering can ends to said point in the same aforesaid timed relation for the assembly of said ends with said bodies; a can end magazine; means for feeding ends from said magazine successively to said can end conveyor; a rocker connected to said can end feed means for actuating the latter when said rocker is oscillated; reciprocating means operating in timed relation with said conveyors and connected to said rocker to oscillate the latter to effect the actuation of said can end feed means; a spring between said reciprocating means and said rocker whereby movement of said rocker in one direction of each oscillation is transmitted thereto from said reciprocating means through said spring, said rocker having a stop shoulder; a latch positioned to drop in front of said shoulder a short distance from the beginning of a reciprocating movement imparted to said rocker through said spring to cause said spring to be compressed and thus prevent the response of said rocker to said spring thereby preventing the actuation of said can end feed means by said rocker; a can body responsive latch actuating arm disposed to be engaged successively by can bodies travelling on said can body conveyor; and means for yieldably connecting said arm to said latch whereby movement of said arm in response to engagement therewith by a can body on said conveyor yieldably urges said latch away from engagement with said shoulder whereupon said latch is yieldably shifted out of the path of said shoulder at the instant said shoulder is shifted out of pressural engagement with said latch thereby freeing said rocker from said latch to cause subsequent reciprocating movements of said reciprocating member to be transmitted through said spring to said rocker, and the actuation by the latter of said can end feed means to cause said can end feed means to feed a can end to the end conveyor whereby said end is delivered to said point in assembled relation with the particular can body, by the engagement of said arm with which, said end was caused to be fed to said end conveyor.

2. A combination as in claim 1 in which said latch actuating arm is provided with yieldable pressure means urging said arm into the path of can bodies travelling on said can body conveyor whereby the omission of a can body from the series of can bodies carried on said can body conveyor results in said pressure means moving said arm into the space normally occupied by the omitted can body, said movement of said arm being transmitted from said arm to said latch through said yieldable connecting means to yieldably shift said latch into engagement with said rocker whereby the movement of said shoulder beyond the position of said latch causes the latter to be yieldably shifted into the return path of said shoulder thereby holding said rocker against oscillation by said spring so long as the omission of can bodies on said can body conveyor permits said arm to remain extended inwardly into the path along which can bodies travel on said can body conveyor.

3. In a mechanism for controlling the delivery of can ends from a can end magazine, the combination of: oscillatory means operable, when actuated, to deliver a can end from said magazine; an oscillatory actuator connected to said can end feed means and oscillatable repeatedly to actuate the latter, said actuator having a peripheral block providing a shoulder; a spring; reciprocating means connected through said spring to said actuator to transmit oscillatory movement to the latter to cause the delivery of a can end from said magazine with each cycle of said oscillatory movement of said actuator; a latch mounted to be shifted into or out of the path of said shoulder, said latch, when in the path of said shoulder, halting movement of said actuator and thus preventing the transmission through said spring of oscillatory movement to said actuator, said latch, when out of the path of said shoulder permitting the transmission of said oscillatory movement to said actuator through said spring; a control for said latch; and yieldable means connecting said control with said latch whereby actuation of said control to shift said latch into the path of said shoulder when said block is disposed to obstruct this movement, results in said latch being pre-loaded by said yieldable means against said block so as to be shifted into the path of said shoulder immediately upon said block moving out of its obstructing position, and whereby, when said control is actuated to shift said latch out of the path of said shoulder and said shoulder is, at the time, disposed in frictional engagement with said latch, and with said latch preventing the transmission of said oscillatory movement through said spring to said actuator, said latch is preloaded by said control tending through said yieldable means, to shift said latch out of the path of said shoulder so that, immediately upon the relaxing of the pressure of said shoulder against said latch, said yieldable means instantly shifts said latch out of the path of said shoulder.

4. In the mechanism for controlling a delivery of can ends from a can end magazine, the combination of: oscillatory delivery means for delivering can ends one at a time from said magazine; a rocker connected to said delivery means and actuating the same by repeated oscillations of said rocker to cause the delivery of a can end from said magazine for each such oscillation, there being a shoulder on said rocker; a spring; reciprocating means for oscillating said rocker, movement of said rocker in one direction in each oscillation being transmitted thereto through said spring; a latch shiftable either away from or into obstructing relation with said shoulder and positioned so as to be in spaced relation with said shoulder in the direction of movement of the latter at the beginning of each such spring urged movement of said rocker; means for controlling the movement of said latch; and yieldable means interposed between said latch and latch control means whereby response of said latch to said control means may be temporarily deferred by engagement of said latch with said rocker, said response of said latch to said control means taking place immediately upon the termination of said obstruction to said response.

5. A combination as in claim 4 in which said rocker has a block with a substantially co-axial arcuate outer face, said shoulder being formed at the leading edge of said block, and in which said latch is yieldably pressed against and rides on said arcuate face of said block when said control means is actuated to interrupt the can end feeding operation, said latch being rapidly impelled by said yieldable means into a position in front of said shoulder immediately upon said block shifting out from under said latch by virtue of the movement of said rocker, said latch remaining in obstructing relation with said shoulder throughout a given cycle of operation of said rocker actuating means during which said latch control means may be actuated to yieldably urge said latch away from in front of said shoulder, said control means becoming effective, in such a case, to so shift said latch at the end of said cycle of movement of said rocker actuating means, at the moment said shoulder is shifted out of pressural engagement with said latch, thereby freeing said rocker to permit it to respond to said rocker actuating means in the next following cycle of operation of the latter.

6. In a mechanism for controlling the delivery of can ends from a magazine, the combination of; a pair of oscillating can end feed devices, said devices being located at opposite sides of said magazine; a pivotally mounted rocker; links pivotally connected to eccentric points on said devices and to eccentric points on said rocker, a portion of said rocker having a peripheral edge substantially concentric with said rocker axis, said edge being offset to provide a shoulder; an apertured slide head pivotally mounted on said rocker at a substantial radius from said rocker axis; a rod, slidable in said head; means axially reciprocating said rod; expansive spring means mounted on said rod between said reciprocating means and said head; nut means on the end of said rod extending from said head, said spring means and nut means gripping said head, whereby the reciprocation of said rod oscillates said rocker and said can end feed devices to feed ends from said magazine with each reciprocation of said rod; a latch; means for pivotally mounting said latch on a fixed axis to permit this either to ride on said peripheral rocker edge with the latch so located as to readily drop behind said shoulder in the return path of the latter, or to swing out of the path of said shoulders; and yieldable control means for applying a substantial yieldable force to said latch to preload the same for movement against said rocker edge and into the path of said shoulder when the latter moves away from beneath said latch, or for movement away from said rocker and out of the path of said shoulder, which latter movement, in response to said yieldable control means takes place immediately upon said latch being free of pressure of said shoulder thereagainst.

7. A combination, as in claim 6, in which said yieldable control means comprises a shaft on which said latch mounting means is fixed to mount said latch coaxially with said shaft; a pair of spring-loaded plungers provided on said mounting means and juxtaposed relative to said latch whereby rotation of said shaft and latch mounting means in either direction causes one of said plungers to pre-load said latch with a rotational torque in that direction; and can-responsive means for rotating said shaft in one direction to swing said latch out of engagement with said rocker when a can is presented at a given location, and in the opposite direction when a can is absent from said location.

8. A combination, as in claim 7, in which said latch mount is provided with a pair of bores at opposite points thereon for receiving said spring-biased plungers; a plunger stop wall formed on said mount opposite said bores which wall limits the distance said plungers extend from said bores; and a pair of pins mounted on said latch and parallel with said shaft, said pins normally contacting the extending faces of both said plungers whereby a torque may be yieldably applied to said latch through one or the other of said plungers by rotation of said shaft in either direction, where rotational movement of said latch with said shaft is obstructed by engagement of said latch with said rocker.

9. In combination: a frame; primary article delivery means for delivering a series of primary articles at uniformly spaced time intervals to an assembly point; secondary article delivery means for delivering a series of secondary articles to said point so that the arrival at said point of said primary and secondary articles will coincide to facilitate the assembly of each of said primary articles with the secondary article arriving at said point coincidentally therewith; a secondary article magazine; means for feeding secondary articles from said magazine to said secondary article delivery means; an intermittently reciprocable member connected to said feed means to actuate the latter to feed a secondary article from said magazine to said secondary article delivery means with each cycle of reciprocation of said member, said member having a stop shoulder; a drive element continuously reciprocated to complete one reciprocation during each of the intervals between successive deliveries of articles to said point; spring means connecting said reciprocating drive element to said reciprocable member to reciprocate the latter through said spring means to actuate said feed means in time with the reciprocation of said element; a stop latch mounted on said frame adjacent said member and, to be shiftable away from or toward said member and, when said member is just concluding one of its reciprocation cycles, into the path of movement of said stop shoulder to prevent the impartation of a reciprocation to said member by the immediately following reciprocation of said element; and yieldable means through which movement is transmitted to said latch to shift the latter toward or away from said member whereby engagement of said latch with said member substantially before the latter reaches the end of a given reciprocating cycle causes said yieldable means to preload said latch in the direction of said member whereby said latch snaps into place in the path of said shoulder as said member closely approaches the end of said reciprocating cycle thereof, said yieldable means also operating, when actuated to shift said latch away from said member, while said latch is pressurably engaged by said shoulder, to preload said latch with a yieldable force tending to shift said latch to a retracted position whereby, upon being freed from said restraint by said shoulder, said latch snaps into said retracted position out of the path of said shoulder.

References Cited in the file of this patent

UNITED STATES PATENTS

| | | |
|---|---|---|
| 1,429,231 | Fleischer | Sept. 19, 1922 |
| 1,468,785 | Huntar | Sept. 25, 1923 |
| 1,506,100 | Wilson | Aug. 26, 1924 |
| 2,579,976 | Simpson | Dec. 25, 1951 |